US010323201B2

(12) United States Patent
Krish et al.

(10) Patent No.: US 10,323,201 B2
(45) Date of Patent: Jun. 18, 2019

(54) FLUID PROCESSING SYSTEM

(71) Applicant: Energy Recovery, Inc., San Leandro, CA (US)

(72) Inventors: Prem Krish, Foster City, CA (US); Jeremy Grant Martin, Oakland, CA (US); John Sienkiewicz, San Mateo, CA (US)

(73) Assignee: ENERGY RECOVERY, INC., San Leandro, CA (US)

( * ) Notice: Subject to any disclaimer, the term of this patent is extended or adjusted under 35 U.S.C. 154(b) by 455 days.

(21) Appl. No.: 15/135,086

(22) Filed: Apr. 21, 2016

(65) Prior Publication Data

US 2016/0312140 A1 Oct. 27, 2016

Related U.S. Application Data

(60) Provisional application No. 62/151,820, filed on Apr. 23, 2015.

(51) Int. Cl.
*B01D 53/14* (2006.01)
*B01D 53/18* (2006.01)
*C10L 3/10* (2006.01)

(52) U.S. Cl.
CPC .............. *C10L 3/103* (2013.01); *B01D 53/14* (2013.01); *B01D 53/1412* (2013.01); *B01D 53/1425* (2013.01); *B01D 53/18* (2013.01); *C10L 3/104* (2013.01); *B01D 53/1462* (2013.01); *B01D 2252/204* (2013.01); *B01D 2256/245* (2013.01);
(Continued)

(58) Field of Classification Search
CPC ........ B01D 2252/204; B01D 2256/245; B01D 2257/304; B01D 2257/504; B01D 53/14; B01D 53/1412; B01D 53/1425; B01D 53/1462; B01D 53/18; C10L 2290/46; C10L 2290/541; C10L 2290/545; C10L 2290/58; C10L 2290/60; C10L 3/103; C10L 3/104
See application file for complete search history.

(56) References Cited

U.S. PATENT DOCUMENTS 4,427,420 A * 1/1984 Reid ................... B01D 53/1425
 203/1
4,659,344 A * 4/1987 Gerlach .................... F04B 9/08
 417/404
(Continued)

FOREIGN PATENT DOCUMENTS

WO 2011/121423 A2 10/2011
WO 2012/114276 A2 8/2012

OTHER PUBLICATIONS

PCT International Search Report and Written Opinion; Application No. PCT/US2016/028854; dated Aug. 1, 2016; 11 pages.

*Primary Examiner* — Cabrena Holecek
(74) *Attorney, Agent, or Firm* — Fletcher Yoder, P.C.

(57) ABSTRACT

A system including a fluid processing system including an absorber configured to remove a component from an untreated first fluid using a lean second fluid, output a treated first fluid, and output a rich second fluid, a stripper configured to strip the component from the rich second fluid, output the lean second fluid, and output the component, a first pump configured to pump the lean second fluid into the absorber, and a hydraulic turbocharger configured to pump the lean second fluid by transferring pressure from the rich second fluid to the lean second fluid.

10 Claims, 5 Drawing Sheets

(52) U.S. Cl.
    CPC .. *B01D 2257/304* (2013.01); *B01D 2257/504* (2013.01); *C10L 2290/46* (2013.01); *C10L 2290/541* (2013.01); *C10L 2290/545* (2013.01); *C10L 2290/58* (2013.01); *C10L 2290/60* (2013.01)

(56) References Cited

U.S. PATENT DOCUMENTS

| | | | | |
|---|---|---|---|---|
| 4,676,806 | A | * | 6/1987 | Dean ...................... B01D 53/14 417/32 |
| 5,492,556 | A | * | 2/1996 | Garrett ................... B01D 3/322 417/404 |
| 6,155,791 | A | * | 12/2000 | Powell ............... B01D 53/1412 137/413 |
| 9,919,265 | B2 | * | 3/2018 | MacPherson ........... F04C 11/00 |
| 2009/0241773 | A1 | * | 10/2009 | Lechnick ........... B01D 53/1425 95/44 |
| 2013/0298763 | A1 | * | 11/2013 | Vitse .................. B01D 53/1462 95/14 |
| 2014/0128655 | A1 | * | 5/2014 | Arluck ...................... C07C 7/11 585/860 |
| 2014/0128656 | A1 | * | 5/2014 | Arluck ...................... C07C 7/11 585/860 |
| 2014/0197563 | A1 | * | 7/2014 | Niven .................... B01D 53/62 264/69 |
| 2015/0211384 | A1 | * | 7/2015 | Krish ................. B01D 53/1425 415/111 |
| 2016/0160849 | A1 | * | 6/2016 | Gains-Germain .... C07C 273/04 417/375 |

\* cited by examiner

FLUID PROCESSING SYSTEM

CROSS-REFERENCE TO RELATED APPLICATIONS

This application is a non-provisional of U.S. Provisional Patent Application No. 62/151,820, entitled "FLUID PROCESSING SYSTEM," filed Apr. 23, 2015, which is herein incorporated by reference in its entirety.

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

The subject matter disclosed herein relates to fluid processing systems.

Natural gas is a naturally occurring hydrocarbon gas mixture used as energy or as a chemical feedstock in the manufacture of plastics and other organic chemicals. Virgin natural gas (e.g., untreated natural gas), as it emerges from natural geologic reservoirs, contains varying amounts of sour gases, particularly carbon dioxide and hydrogen sulfide, also referred to as acid gases. Carbon dioxide reduces the calorific value of the natural gas, while the hydrogen sulfide may transform into sulfur dioxide, sulfur trioxide, and/or sulfuric acid. Gas treatment processes have been developed to remove these sour gas components from virgin natural gas to convert the virgin natural gas into sweet gas (e.g., treated natural gas) suitable for combustion in domestic and industrial applications. Unfortunately, large amounts of energy may be lost when the sour gases are stripped from the natural gas.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements.

The disclosed embodiments relate generally to a fluid processing system (e.g., natural gas processing system) with an active fluid that circulates between low- and high-pressure sections. For example, the fluid processing system may include one or more parallel pumping systems in the high-pressure section. These parallel pumping systems include a pump section of a hydraulic turbocharger and one or more pumps (e.g., high-pressure pumps) that increase the pressure of the active fluid. In contrast, the low-pressure section decreases the pressure of the active fluid using a turbine section of the hydraulic turbocharger and one or more valves. In operation, the hydraulic turbocharger transfers pressure between low- and high-pressure streams of the fluid processing system, which increases the efficiency of the fluid processing system by reducing the number of pumps in the parallel pumping system and/or by reducing energy use by one or more pumps. However, the hydraulic turbocharger may be capable of pumping more fluid (e.g., higher flow rate) than the pumps. Accordingly, to reduce or block hydraulic instabilities (e.g., back flow) from unequal pumping capacity, the fluid processing system may include valves and a controller that regulates flow rates and pump use.

Figure 1:
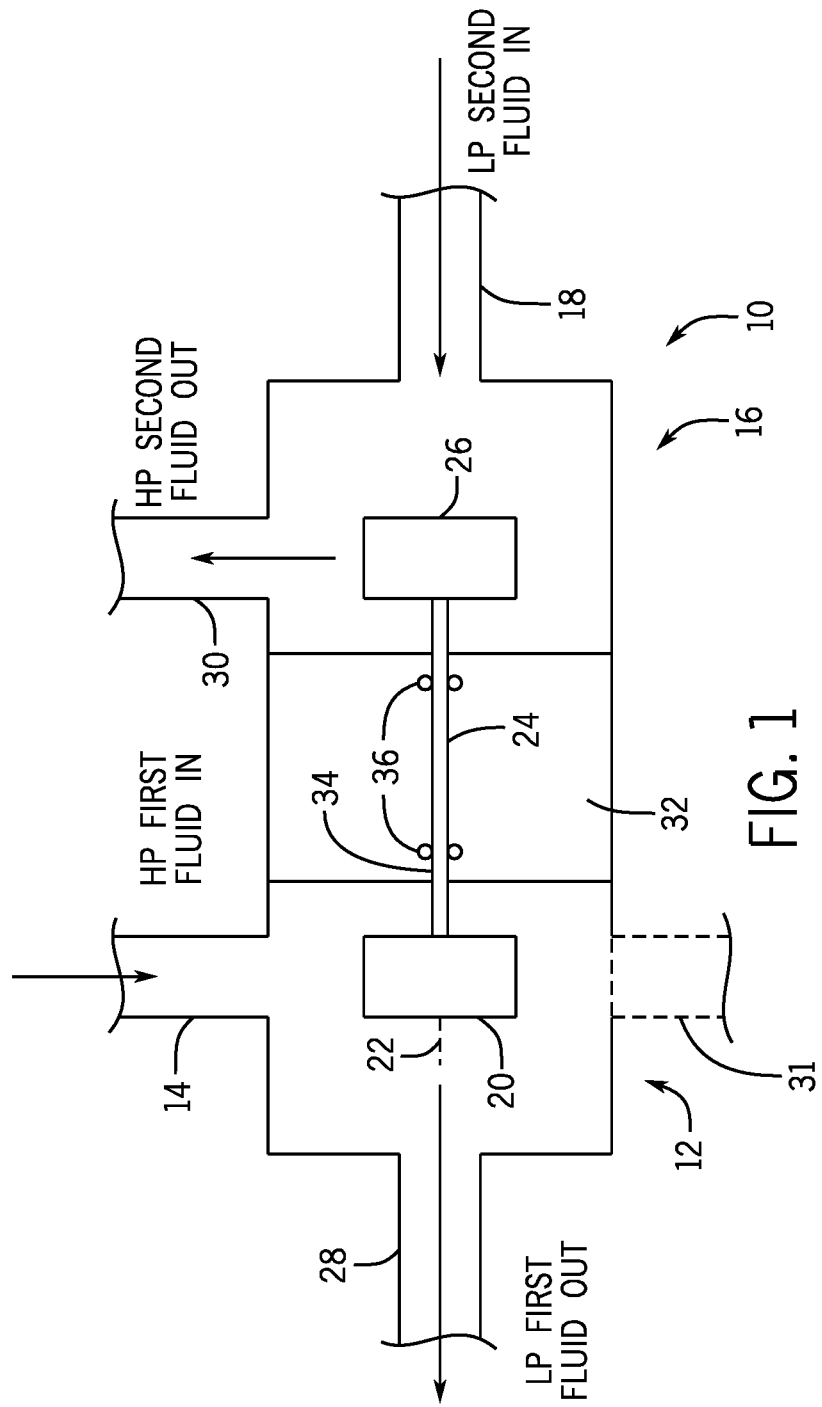
FIG. 1 is a schematic diagram of an embodiment of a hydraulic turbocharger.

FIG. 1 is a schematic diagram of an embodiment of a hydraulic turbocharger 10. As explained above, the hydraulic turbocharger 10 transfers work and/or pressure from a high-pressure section to a low-pressure section of a fluid processing system. As illustrated, the first fluid (e.g., high-pressure active fluid) enters a turbine section 12 of the hydraulic turbocharger 10 through a first inlet 14, and the second fluid (e.g., low-pressure active fluid) may enter the hydraulic turbocharger 10 on a pump or compressor section 16 through a second inlet 18. As the first fluid enters the hydraulic turbocharger 10, the first fluid contacts the first impeller 20 transferring energy from the first fluid to the first impeller 20, which drives rotation of the first impeller 20 about the axis 22. A shaft 24 transfers this rotational energy from the first impeller 20 to the second impeller 26. After transferring energy to the first impeller 20, the first fluid exits the hydraulic turbocharger 10 as a low-pressure fluid through a first outlet 28. The rotation of the second impeller 26 then increases the pressure of the second fluid entering the hydraulic turbocharger 10 through the second inlet 18. Once pressurized, the second fluid exits the hydraulic turbocharger 10 as a high-pressure active fluid through a second outlet 30 for use in fluid processing system. In some embodiments, the hydraulic turbocharger 10 may include an auxiliary nozzle 31 (e.g., secondary inlet) that increases fluid flow through the turbine section 12 while reducing radial thrust on the first impeller 20.

In order to block contact between the first and second fluids, the hydraulic turbocharger 10 includes a wall 32 between the turbine and pump sections 12, 16. The wall 32 includes an aperture 34 that enables the shaft 24 (e.g., cylindrical shaft) to couple to the first and second impellers 20 and 26 while simultaneously blocking fluid flow. In some embodiments, the hydraulic turbocharger 10 may include seals (e.g., annular seals) and/or bearings 36 that may further reduce or block fluid exchange between the first and second fluids.

Figure 2:
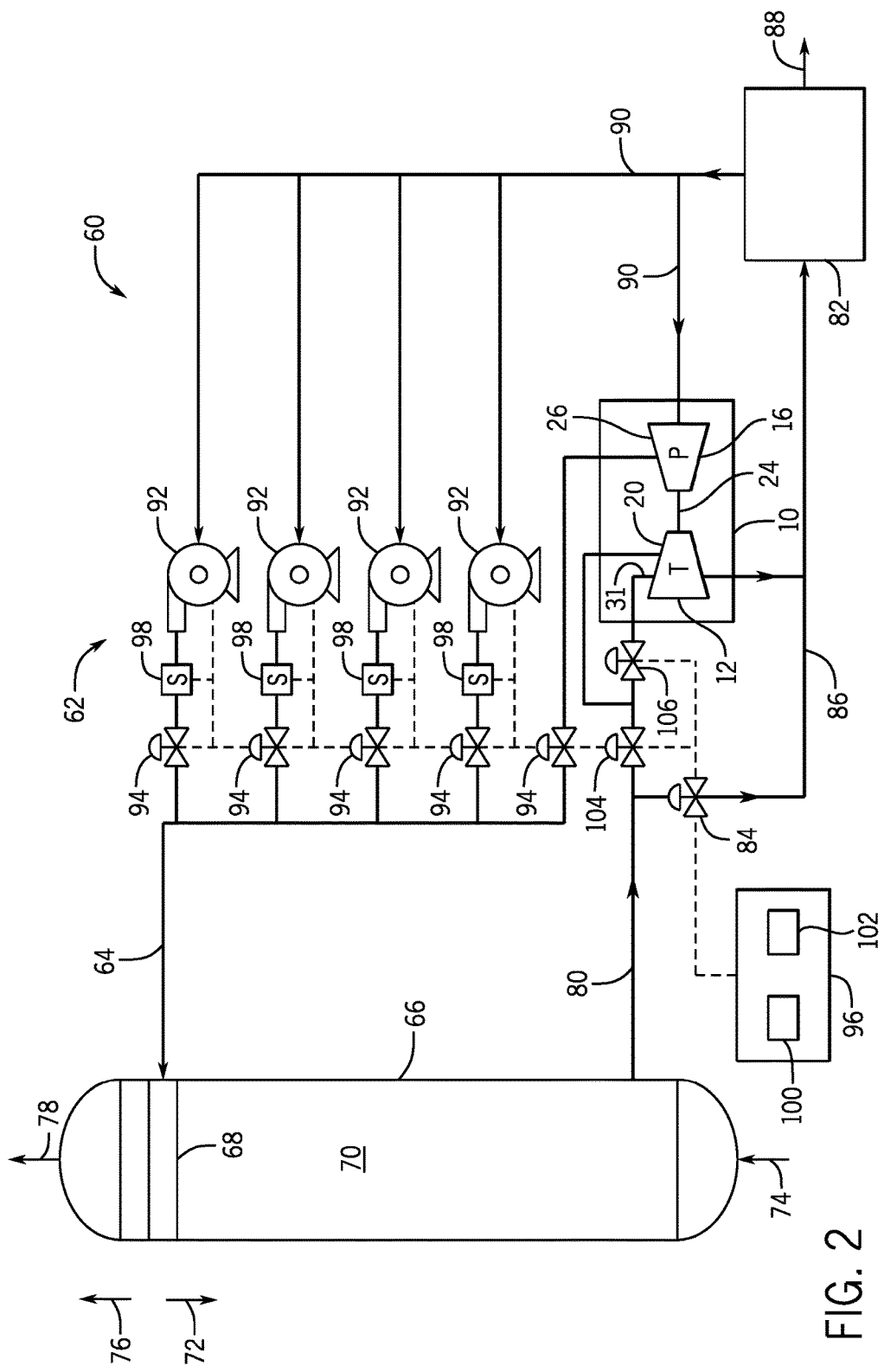
FIG. 2 is a schematic diagram of an embodiment of a fluid processing system with a hydraulic turbocharger.

FIG. 2 is a schematic diagram of an embodiment of a fluid processing system 60 (e.g., natural gas processing system). In operation, the fluid processing system 60 uses a parallel pumping system 62 to pump a lean-high-pressure-active fluid 64 (e.g., a water-based amine solutions such as alkylamine or amine without sour gases) into an absorber 66. As illustrated, the parallel pumping system 62 pumps the lean-high-pressure-active fluid 64 into a tray 68 at the top of the absorber 66. The tray 68 then distributes the lean-high-pressure-active fluid 64 across an interior chamber 70. As the lean-high-pressure-active fluid 64 flows in axial direction 72, the lean-high-pressure-active fluid 64 contacts natural gas 74 flowing in the opposite axial direction 76. The contact between the natural gas 74 and the lean-high-pressure-active fluid 64 removes sour gases (e.g., carbon dioxide, hydrogen sulfide) from the natural gas 74. Thus converting the natural gas 74 into a treated natural gas 78 (e.g., sweet gas substantially free of sour gases) and the lean-high-pressure-active fluid 64 into a rich-high-pressure-active fluid 80 (e.g., active fluid with sour gases). As used herein, the terms "lean" and "rich" are relative and imply, respectively, a lesser or a greater amount of sour gases in the fluids. In some embodiments, the lean-high-pressure-active fluid 64 may be substantially free or devoid of sour gases (e.g., the lean-high-pressure-active fluid 64 may contain less than 5% sour gases by volume).

After removing the sour gases, the rich-high-pressure-active fluid 80 exits the absorber 66 and flows to a stripper 82 (e.g., regenerator). In order to treat (e.g., remove sour gases) the rich-high-pressure-active fluid 80, the fluid processing system 60 reduces the pressure of the rich-high-pressure-active fluid 80. The fluid processing system 60 may reduce the pressure of the rich-high-pressure-active fluid 80 by directing the rich-high-pressure-active fluid 80 through a valve 84 (e.g., throttling valve) and/or the hydraulic turbocharger 10. In this way, the valve 84 (e.g., throttling valve) and/or the hydraulic turbocharger 10 changes the rich-high-pressure-active fluid 80 into a rich-low-pressure-active fluid 86. The rich-low-pressure-active fluid 86 then flows into the stripper 82, which removes the sour gases (e.g., carbon dioxide and hydrogen sulfide) to produce a sour gas stream 88 and a lean-low-pressure-active fluid 90. The fluid processing system 60 then repressurizes the lean-low-pressure-active fluid 90 before recirculating it back into the absorber 66.

The fluid processing system 60 repressurizes the lean-low-pressure-active fluid 90 in the parallel pumping system 62, which converting the lean-low-pressure-active fluid 90 into the lean-high-pressure-active fluid 64. As illustrated, the parallel pumping system 62 includes one or more pumps 92 (e.g., 1, 2, 3, 4, 5, or more) and one or more hydraulic turbochargers 10 (e.g., 1, 2, 3, 4, 5, or more). The pumps 92 and hydraulic turbochargers 10 increase the pressure of the lean-low-pressure-active fluid 90 converting the lean-low-pressure-active fluid 90 into a lean-high-pressure-active fluid 64 for use in the absorber 66. By including one or more hydraulic turbochargers 10, the fluid processing system 60 may reduce the number, size, and/or energy consumption of pumps 86, while simultaneously reducing the pressure of the rich-high-pressure-active fluid 80 for treatment in the stripper 82.

As explained above, the hydraulic turbocharger 10 includes the turbine section 12 and the pump section 16. In operation, rich-high-pressure-active fluid 80 enters the turbine section 12 rotating the first impeller 20. As the first impeller 20 rotates, the rich-high-pressure-active fluid 80 loses pressure and exits the turbine section 12 as a rich-low-pressure-active fluid 86. The shaft 24 transfers this rotational energy from the first impeller 20 to the second impeller 26 in the pump section 16. The second impeller 26 then increases the pressure of the lean-low-pressure-active fluid 90 converting the lean-low-pressure-active fluid 90 into the lean-high-pressure-active fluid 64. Accordingly, the fluid processing system 60 may reduce operating costs by using less electrical power and/or fewer pumps 92 by pressurizing the lean-low-pressure-active fluid 90 with energy in the rich-high-pressure-active fluid 80.

In order to control the amount of fluid flow through each of the pump(s) 92 and the hydraulic turbocharger 10, the fluid processing system 60 may include multiple valves 94. Each of these valves 94 controls fluid flow through a respective pump 92 or the hydraulic turbocharger 10. As illustrated, the valves 94 are downstream of the pumps 92 and the hydraulic turbocharger 10. However, in certain embodiments the valves 94 may be upstream of the pumps 92 and the hydraulic turbocharger 10. In operation, the fluid processing system 60 uses the valves 92 to equalize fluid flow through the pumps 92 and the hydraulic turbocharger 10. In other words, the pumps 92 and the hydraulic turbocharger 10 may pump an equal amount of fluid. For example, the hydraulic turbocharger 10 may be capable of pumping more fluid than a pump 92, thus introducing hydraulic instabilities (e.g., back flow through pumps 92). Accordingly, the fluid processing system 60 includes the valves 94, which block or reduce hydraulic instabilities.

The fluid processing system 60 controls the valves 94 with a controller 96 that receives feedback from sensors 98. For example, the controller 96 may receive flow rate data from the sensors 98 indicative of flow rates through each of the pumps 92 and the hydraulic turbocharger 10. If the controller 96 receives feedback from the sensors 98 indicating the that flow rate from the hydraulic turbocharger 10 and/or one or more pumps 92 is too great or too little, the controller 96 executes instructions with the processor 100 that are stored in the memory 102. These instructions enable the controller 96 to control the opening, closing, partial opening, or partial closing of one or more valves 94.

The controller 96 may include one or more microprocessors, microcontrollers, integrated circuits, application specific integrated circuits, and so forth. Additionally, the memory 102 may be provided in the form of tangible and non-transitory machine-readable medium or media (such as a hard disk drive, etc.) having instructions recorded thereon for execution by a processor (e.g., the controller 96) or a computer. The set of instructions may include various commands that instruct the controller 96 to perform specific operations such as the methods and processes of the various embodiments described herein. The set of instructions may be in the form of a software program or application. The memory 102 may include volatile and non-volatile media, removable and non-removable media implemented in any method or technology for storage of information such as computer-readable instructions, data structures, program modules or other data. The computer storage media may include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other suitable storage medium. Further, in some embodiments, the controller 96 may include or may be connected to a device (e.g., an input and/or output device) such as a computer, laptop computer, monitor, cellular or smart phone, tablet, other handheld device, or the like that may be configured to receive data and show the data on a display of the device.

In some embodiments, the fluid processing system 60 may reduce operating costs (e.g., use less electrical power and/or fewer pumps 92) by maximizing use of the hydraulic turbocharger 10. For example, the controller 96 may completely open the valve 94 coupled to the hydraulic turbocharger 10, as well as the valves 104 and 106. As illustrated, by opening valve 104 the fluid processing system 60 increases flow into the turbine section 12 of the hydraulic turbocharger 10. In some embodiments, the hydraulic turbocharger 10 may be include an auxiliary nozzle 31 (e.g., additional inlet) that is fed with fluid flow through the valve 106. In operation, fluid flow into the auxiliary nozzle 31 may increase overall fluid flow through the turbine section 12 as well as balance radial thrust on the first impeller 20. By maximizing flow of the rich-high-pressure-active fluid 80 through the turbine section 12, the hydraulic turbocharger 10 increases the power available for pumping the lean-low-pressure-active fluid 90. Accordingly, while the hydraulic turbocharger 10 maximizes pumping of the lean-low-pressure-active fluid 90, the controller 96 shuts down or slows one or more of the pumps 92, thus reducing the use of power by the pumps 92. For example, the pumps 92 may have variable frequency drives (VFDs) that enable the controller 96 to decrease power to the pumps 92. Likewise, the controller 96 may reduce fluid flow through the hydraulic turbocharger 10 by closing or partially closing valves 94, 104, and/or 106. If the controller 96 reduces fluid flow through the hydraulic turbocharger 10, the controller 96 may compensate by opening one or more of the valves 94 to increase fluid flow through the pumps 92.

Figure 3:
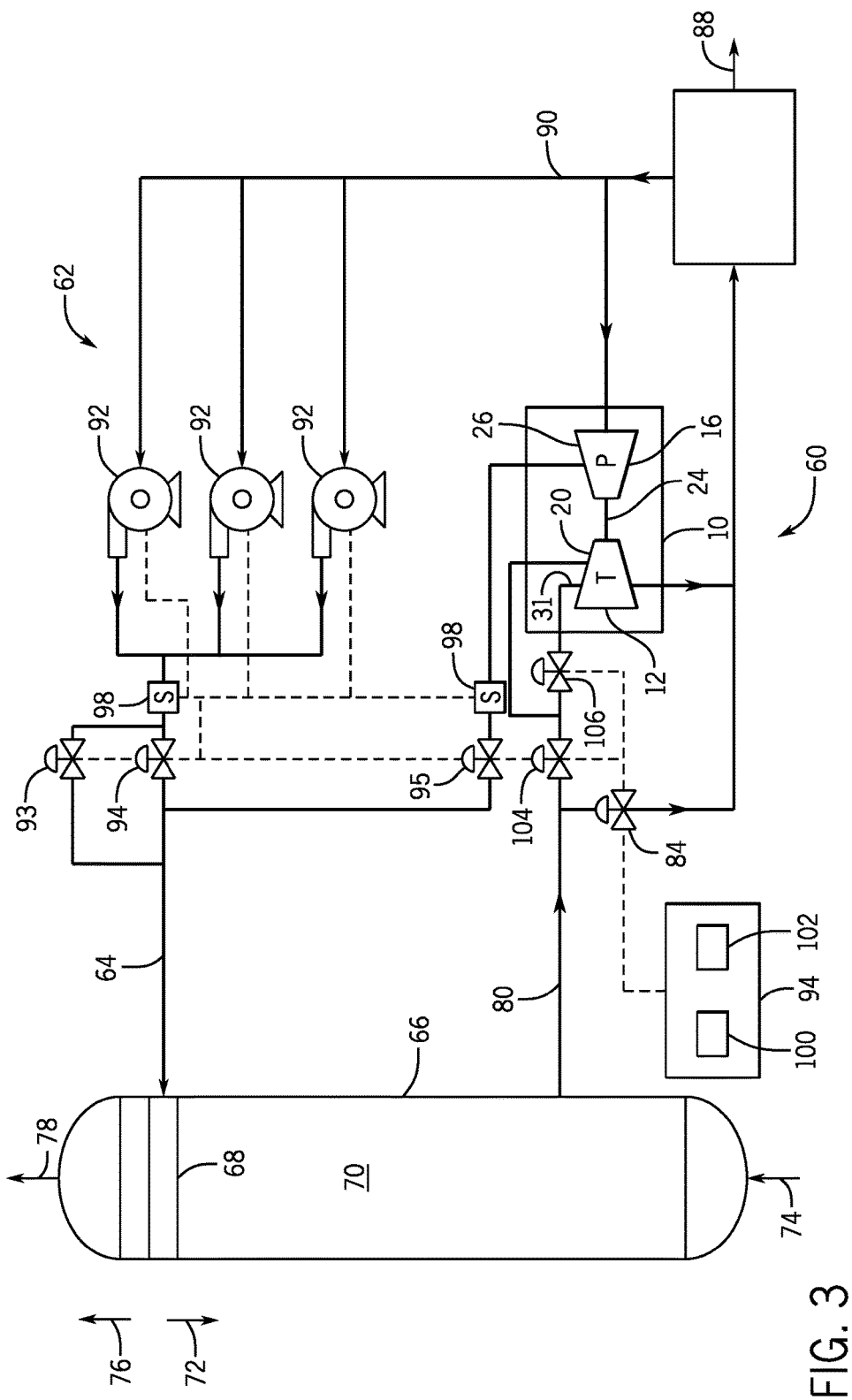
FIG. 3 is a schematic diagram of an embodiment of a fluid processing system with a hydraulic turbocharger.

FIG. 3 is a schematic diagram of an embodiment of a fluid processing system 60 (e.g., natural gas processing system). As explained above, the fluid processing system 60 uses a parallel pumping system 62 to pump a lean-high-pressure-active fluid 64 (e.g., a water-based amine solutions such as alkylamine or amine without sour gases) into an absorber 66. The parallel pumping system 62 includes multiple pumps 92 (e.g., 1, 2, 3, 4, 5 or more) and one or more hydraulic turbochargers 10. However, instead of including a valve for each of the pumps 92, the parallel pumping system 62 may include valves 93 and 94 to accommodate different numbers of operating pumps 92. For example, the valve 94 may be capable of controlling fluid flow from all three operating pumps 92 while the valve 93 is capable of controlling fluid flow from two of the pumps 92. In this way, the valves 93, 94 enable hydraulically stable operation (e.g., equal flow rates) through all or a subset of the pumps 92. It should be understood that the number of pumps 92 may vary as well as the capacity of the valves 93 and 94 to accommodate flow rates from different numbers of pumps 92. Fluid flow through the hydraulic turbocharger 10 is likewise controlled with a valve, but with valve 95. As illustrated, the valves 93, 94, and 95 are downstream of the pumps 92 and the hydraulic turbocharger 10. However, in certain embodiments the valves 93, 94, and 95 may be upstream of the pumps 92 and the hydraulic turbocharger 10.

As explained above, the hydraulic turbocharger 10 may replace a pump 92 to reduce operating costs. For example, the fluid processing system 60 may use a controller 94 to shutdown one of the pumps 92 and enable the hydraulic turbocharger 10 to replace the lost fluid flow. In order to control the changing flow rate from the pumps 92, the controller closes the valve 94 and opens the valve 93. Moreover, the controller 94 opens the valve 95 so that the hydraulic turbocharger 10 provides the replacement fluid flow for one of the pumps 92. In operation, the controller 96 receives feedback from the sensors 98 (e.g., flow rates sensors) indicating the flow rates of fluid from the combined pumps 92 and the hydraulic turbocharger 10. In response, the controller 96 may adjust the flow rate from the combined pumps 92 or the hydraulic turbocharger 10. For example, the controller may close or partially close the valves 93 or 94 coupled to the combined pumps 92 and increase the flow rate through the hydraulic turbocharger 10. Likewise, the controller 96 may reduce the flow rate through the hydraulic turbocharger 10 by closing or partially closing the valve 95 coupled to the hydraulic turbocharger 10, while simultaneously opening or partially opening the valves 93 or 94 coupled to the combined pumps 92. In other words, the fluid processing system 60 uses the valves 93, 94, and 95 to equalize or adjust flow rates between the pumps 92 and the hydraulic turbocharger 10. Accordingly, hydraulic turbocharger 10 and the combined pumps 92 may pump equal amounts of fluid or different flow rate percentages.

Figure 4:
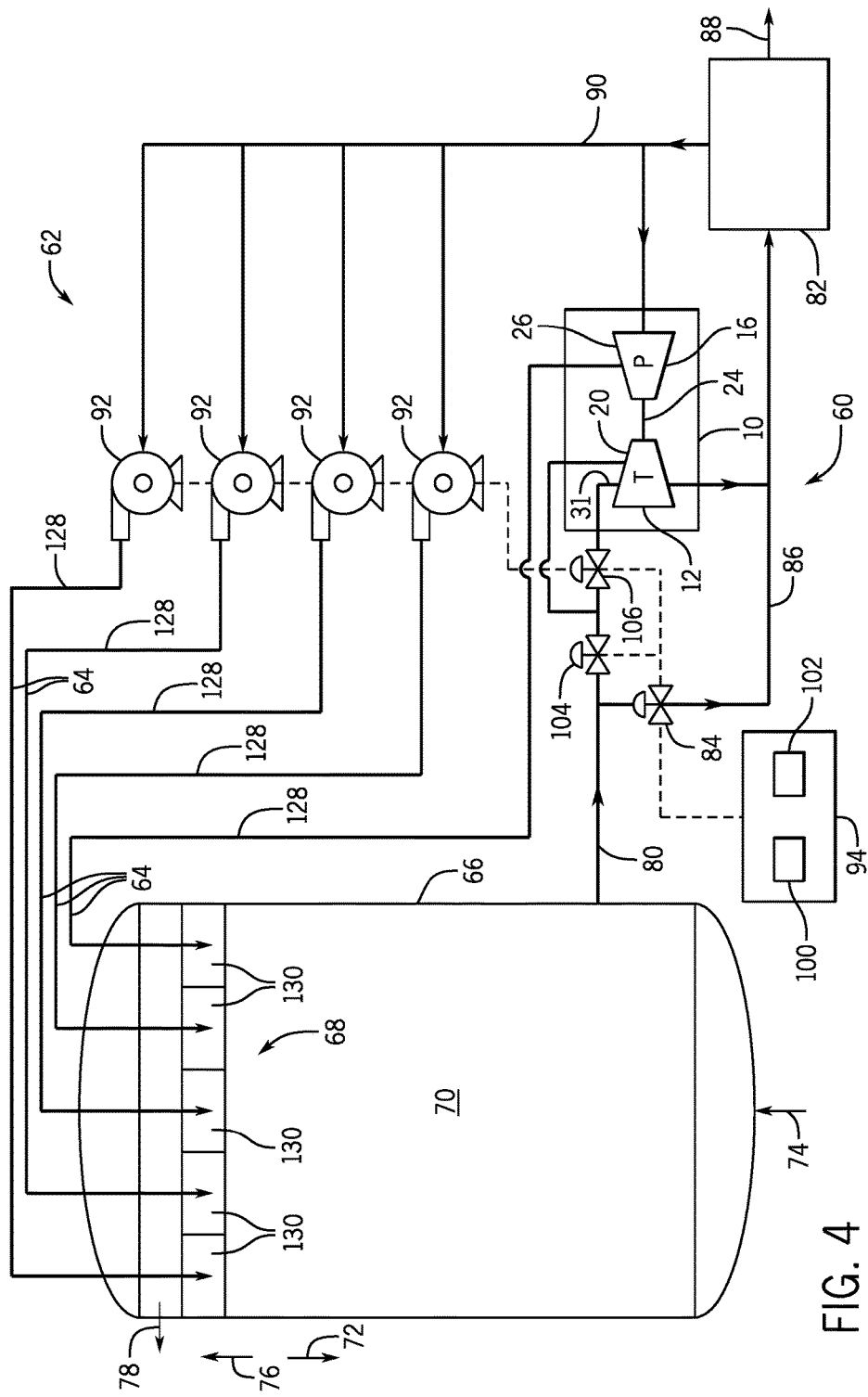
FIG. 4 is a schematic diagram of an embodiment of a fluid processing system with a hydraulic turbocharger.

FIG. 4 is a schematic diagram of an embodiment of a fluid processing system 60 (e.g., natural gas processing system). In operation, the fluid processing system 60 uses the parallel pumping system 62 to pump the lean-high-pressure-active fluid 64 (e.g., a water-based amine solutions such as alkylamine or amine without sour gases) into an absorber 66. The parallel pumping system 62 includes multiple pumps 92 (e.g., 1, 2, 3, 4, 5 or more) and one or more hydraulic turbochargers 10. However, instead of combining all of the flows from the pumps 92 and the hydraulic turbocharger 10 into a single line that feeds the absorber 66, the flow processing system 60 includes a line 128 (e.g., leg) for each pump 92 and the hydraulic turbocharger 10. As illustrated, each of the lines 128 feeds a separate section 130 of the tray 68, thus blocking or reducing hydraulic interaction between lines 128, and therefore hydraulic interaction between the pumps 92 and/or hydraulic turbocharger 10. In order words, the separate lines 128 block or reduce hydraulic instabilities in the fluid processing system 60 when using different fluid pumps (e.g., pumps 92, hydraulic turbocharger 10).

Figure 5:
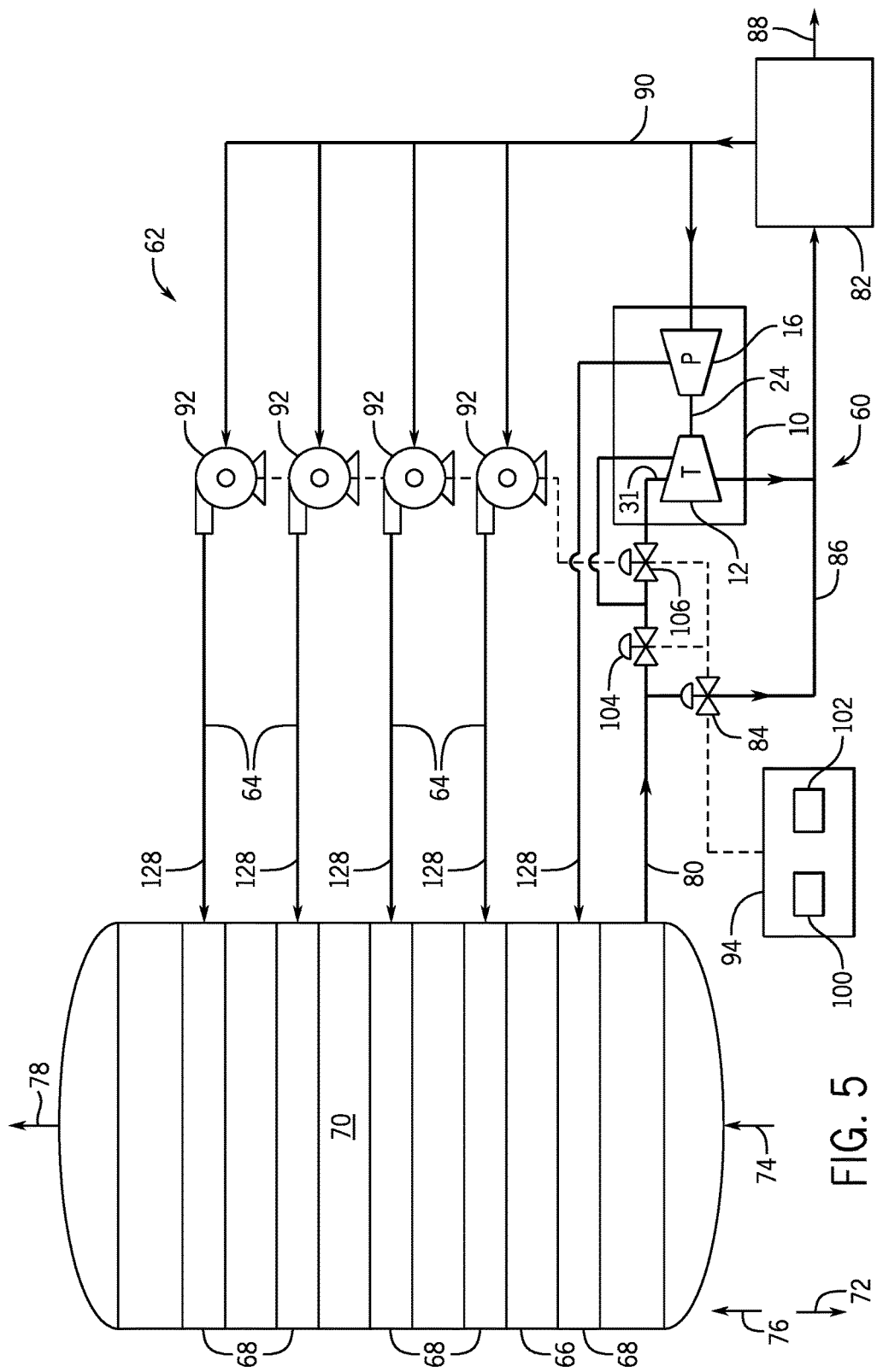
FIG. 5 is a schematic diagram of an embodiment of a fluid processing system with a hydraulic turbocharger.

FIG. 5 is a schematic diagram of an embodiment of a fluid processing system 60 (e.g., natural gas processing system). In operation, the fluid processing system 60 uses the parallel pumping system 62 to pump the lean-high-pressure-active fluid 64 (e.g., a water-based amine solutions such as alkylamine or amine without sour gases) into an absorber 66. The parallel pumping system 62 includes multiple pumps 92 (e.g., 1, 2, 3, 4, 5 or more) and one or more hydraulic turbochargers 10. However, instead of combining all of the flows from the pumps 92 and the hydraulic turbocharger 10 into a single line that feeds the absorber 66, the flow processing system 60 includes a line 128 (e.g., leg) for each pump 92 and the hydraulic turbocharger 10. As illustrated, each of the lines 128 feeds a separate tray 68, thus blocking or reducing hydraulic interaction between lines 128, and therefore hydraulic interaction between the pumps 92 and/or hydraulic turbocharger 10. In order words, the separate lines 128 block or reduce hydraulic instabilities in the fluid processing system 60 when using different fluid pumps (e.g., pumps 92, hydraulic turbocharger 10).

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims.

What is claimed is:

1. A system, comprising:
   a fluid processing system, comprising:
   an absorber configured to remove a component from an untreated first fluid using a lean second fluid, output a treated first fluid, and output a rich second fluid;
   a stripper configured to strip the component from the rich second fluid, output the lean second fluid, and output the component;
   a first pump configured to pump the lean second fluid into the absorber; and
   a hydraulic turbocharger configured to pump the lean second fluid by transferring pressure from the rich second fluid to the lean second fluid, wherein the hydraulic turbocharger comprises a turbine section and a pump section.

2. The system of claim 1, comprising a first valve and a second valve configured to reduce hydraulic instabilities in the fluid processing system, wherein the first valve controls a first flow rate of the lean second fluid through the hydraulic turbocharger and a second valve controls a second flow rate of the lean second fluid through the first pump.

3. The system of claim 2, comprising a second pump hydraulically parallel with the first pump.

4. The system of claim 3, comprising a third valve configured to control a third flow rate of the lean second fluid through the second pump.

5. The system of claim 4, comprising a controller configured to control the first, second, and third valves.

6. The system of claim 5, comprising a first sensor, a second sensor, and a third sensor coupled to the controller, wherein the first sensor is configured to detect the first flow rate, the second sensor is configured to detect the second flow rate, and the third sensor is configured to detect the third flow rate.

7. The system of claim 1, wherein the first pump and hydraulic turbocharger couple to a tray in the absorber with hydraulically separate lines.

8. The system of claim 1, wherein the first pump and the hydraulic turbocharger couple to separate trays in the absorber with hydraulically separate lines.

9. The system of claim 1, comprising a second pump fluidly coupled to and parallel with the first pump.

10. The system of claim 9, comprising a first valve and a second valve configured to reduce hydraulic instabilities in the fluid processing system, wherein the first valve controls a first flow rate of the lean second fluid through the hydraulic turbocharger and a second valve controls a second combined flow rate of the lean second fluid through the first and second pumps.

\* \* \* \* \*